(12) United States Patent
Squires

(10) Patent No.: US 7,033,556 B1
(45) Date of Patent: *Apr. 25, 2006

(54) METHOD AND APPARATUS FOR CAKE-FORMING GRANULAR-BED FILTRATION

(76) Inventor: Arthur M. Squires, P.O. Box 10098, Blacksburg, VA (US) 24062

( * ) Notice: Subject to any disclaimer, the term of this patent is extended or adjusted under 35 U.S.C. 154(b) by 484 days.

This patent is subject to a terminal disclaimer.

(21) Appl. No.: 10/303,739

(22) Filed: Nov. 26, 2002

Related U.S. Application Data

(60) Provisional application No. 60/332,543, filed on Nov. 26, 2001.

(51) Int. Cl.
*B01D 45/00* (2006.01)

(52) U.S. Cl. .................... 423/215.5; 422/216

(58) Field of Classification Search .......... 423/215.5; 95/274–276, 107; 55/282, 302, 474, 479, 55/517, 518; 422/216; 96/108
See application file for complete search history.

(56) References Cited

U.S. PATENT DOCUMENTS

| | | | |
|---|---|---|---|
| 3,296,775 A | | 1/1967 | Squires |
| 3,800,508 A | | 4/1974 | Zenz |
| 3,926,587 A | | 12/1975 | Squires |
| 3,926,593 A | | 12/1975 | Squires et al. |
| 3,928,532 A | | 12/1975 | Squires |
| 3,957,953 A | | 5/1976 | Squires |
| 3,987,148 A | | 10/1976 | Squires |
| 4,004,350 A | * | 1/1977 | Squires ................ 34/506 |
| 4,004,897 A | * | 1/1977 | Squires ................ 95/276 |
| 4,006,533 A | | 2/1977 | Squires |
| 4,017,278 A | | 4/1977 | Reese |
| 4,308,036 A | * | 12/1981 | Zahedi et al. .......... 95/275 |
| 4,349,367 A | * | 9/1982 | Krumwiede ........... 65/27 |
| 4,354,862 A | * | 10/1982 | Sgaslik ................ 55/296 |
| 4,360,364 A | * | 11/1982 | Kohl .................. 95/275 |
| 4,548,623 A | * | 10/1985 | Naske ................. 96/230 |
| 4,880,608 A | * | 11/1989 | Stelman ............ 423/244.01 |
| 5,165,900 A | * | 11/1992 | Miksitz ............... 55/474 |
| 5,527,514 A | | 6/1996 | Watanabe et al. |
| 6,783,572 B1 | * | 8/2004 | Squires ............... 95/274 |

OTHER PUBLICATIONS

Lee et al.; *The Panel Bed Filter*, Final Report to Electric Power Research Institute (EPRI); Report # AF-560; May 1977.

Rodon et al.; *Panel Bed Filtration Data for Three Dusts at 150° C.*; Paper 79-56.5 presented at meeting of Air Pollution Control Ass'n; Cincinnati, OH; Jun. 1979; 16 pages.

Squires et al; *The Panel Bed; A Fluid-Solid Contacting Device Exploiting a New Mode of Soil Failure*; Paper presented at POWTECH 81; Birmingham, England, Mar. 1981: 16 pages.

Risnes et al.; *Evaluation of a novel granular bed filtration system for high temperature applications*; Paper presented at Conference "Progress in Thermochemical Biomass Conversion", Tyrol, Austria: 2000; 12 pages.

* cited by examiner

*Primary Examiner*—Edward M. Johnson
(74) *Attorney, Agent, or Firm*—James Creighton Wray; Meera P. Narasimhan

(57) ABSTRACT

There is provided a granular-bed filter for cleaning a gas containing fine particulate matter ("dust"). A multiplicity of vertically disposed filter trays are assembled to form a "panel." In each filter tray, an inclined porous plate supports a bed of granular material. Each bed presents an inclined gas-entry face that receives gas from a vertically-disposed dusty-gas-distribution compartment nearby the face's lower edge. A filter cake forms upon the gas-entry face. Preferably, the bed's depth is substantially the same at its upper and lower edges. Cleaned gas leaves a tray across the porous plate and flows into a vertically-disposed cleaned-gas-collection compartment. After an interval of filtration, gas-entry faces are renewed by producing en masse displacement of the material respecting the supporting plates, the displacement producing a spill of a surface layer from each gas-entry face. The displacement is preferably accomplished by causing the support plates to move sharply upward (e.g., as may be caused by an upward blow of a hammer). The displacement may also be caused by subjecting the panel to a reverse transient surge flow of gas (i.e., a "puff-back"). After face renewal, granular material descends by gravity from an elevated source to make good loss of the material from the faces.

14 Claims, 9 Drawing Sheets

METHOD AND APPARATUS FOR CAKE-FORMING GRANULAR-BED FILTRATION

This application claims the benefit of U.S. Provisional Application No. 60/332,543, filed Nov. 26, 2001.

FIELD OF THE INVENTION

The invention relates to the filtering of fine particulate matter ("dust") from a gas.

BACKGROUND OF THE INVENTION

An old idea is to treat a gas and a granular solid material by causing the gas to flow in the horizontal direction across a bed of the solid material disposed in a "panel" that has often been tall in comparison with its width in the direction of gas flow. Often, the "panel bed" has been held in place by louvered walls that resembled Venetian blinds. My U.S. Pat. No. 4,006,533 (Feb. 8, 1977) cites early art and is incorporated by reference in the instant application.

Some designs called for continuous or intermittent motion of granular material downward through the panel, fresh material being supplied at the panel's top and "spent" material being withdrawn at its bottom. A representative recent proposal along this line is to be found in U.S. Pat. No. 5,527,514 (Jun. 18, 1996). U.S. Pat. No. 4,017,278 (Apr. 12, 1977) provided performance data for a gas-filtration device of this kind. The panel contained "gravel" 2 to 12 mm in size. Superficial velocity of dusty gas approaching the panel was 25 to 100 cm/s. Herein, superficial velocity=rate of gas flow divided by the projected vertical frontal area of the panel (panel height×panel width). Downward speed of the gravel mass was 30 cm/hr. Dust content of filtered gas ranged from ~25 to ~150 milligrams per normal cubic meter (mg/Nm$^3$). Filtered dust accumulated within the gravel bed, not upon the gas-entry faces that it presented. In other words, the device filtered the dust by what practitioners term a "deep-bed filtration mechanism."

In other designs, granular material was stationary much of the time. These designs filtered dust from gas by accumulating a cake of the dust (a "filter cake") upon gas-entry faces of granular material retained in a panel bed. Such designs are capable of providing filtered gas containing levels of residual dust comparable to that provided by fabric filtration. Both a panel bed of this type and a fabric filter employ a "surface filtration mechanism," in which the filter cake is in fact the filtration medium; the primary function of either granular bed or fabric is to support the cake. Means are provided for intermittent renewal of gas-entry faces through removal of a moiety of the granular material from these faces together with accumulated dust. Means for outwardly tipping louvers that support gas-entry faces and for drawing plows horizontally along the faces have been proposed. U.S. Pat. No. 3,800,508 (Apr. 2, 1974) not only provided means for pivoting louvers but also employed a gas-entry velocity at gas-entry faces sufficient to support the faces at an angle steeper than the dynamic angle of repose of the granular material; momentary interruption of gas flow produced a spill of this material along with filter cake.

My U.S. Pat. No. 3,296,775 (Jan. 10, 1967) disclosed a puff-back method for renewing gas-entry faces of a panel bed of the type wherein louvers support gas-entry portions of the bed. Puff-back entailed creation of a reverse transient surge flow to produce en masse displacement of the bed's gas-entry portions respecting the supporting louvers. My U.S. Pat. No. 4,006,533 (Feb. 8, 1977) specified a reverse transient surge flow of a more particular character, whose discovery made possible development of a practical panel-bed filter employing a surface filtration mechanism for cleaning a dusty gas (K. C. Lee, I. Rodon, M. S. Wu, R. Pfeffer, and A. M. Squires, The Panel Bed Filter, EPRI AF-560, Electric Power Research Institute, Palo Alto Calif., May 1977; I. Rodon, K. C. Lee, R. Pfeffer, and A. M. Squires, Panel Bed Filtration Data for Three Dusts at 150° C., paper 79-56.5 presented at meeting of Air Pollution Control Association, Cincinnati, Ohio, June 1979; A. M. Squires, K. C. Lee, and R. Pfeffer, The Panel Bed: A Fluid-Solid Contacting Device Exploiting a New Mode of Soil Failure, paper presented at POWTECH 81, Birmingham, England, March 1981). Operation of a panel-bed filter is cyclic, an interval of filtration alternating with a puff-back that removes both filter cakes and a moiety of sand lying directly beneath the cake, thereby renewing the bed's gas-entry faces. During an interval of filtration, paralleling the formation of the filter cake is an increase in pressure drop in the gas flowing across the bed. This pressure drop cannot be allowed to increase without limit, for two reasons: an unduly large pressure drop would increase cost for gas-compression beyond an economic limit and would impose a force upon the filter cake sufficient to break off chunks of the cake, driving these deep into the granular bed and harming filtering efficiency. Although the object of face-renewal is to present a new free face, it is inadvisable to employ such a strong puff-back as to yield an absolutely clean face. In operation of panel-bed filters, experience has taught that a clean face does not filter as well as a somewhat dirty face. In a subsequent filtering interval, I believe, a new filter cake forms quicker upon a dirty face than upon a strictly clean one.

Commercial-scale panel-bed-filter modules have now successfully cleaned hot gaseous products of combustion of both coal and wood waste, hot gas from cement production, and hot gas from electrometallurgical manufacture of ferro-silicon (this latter gas, containing a fine silica fume, is particularly difficult to clean). Typically, dust in the cleaned gas amounted to less than 5 mg/Nm$^3$.

The tests used ordinary sand as granular medium. Suitably, the sand was about 0.15–0.45 mm in size. In small-scale tests at elevated temperature (e.g., 150 to 500° C.), I found this size, for dusts studied so far, to be substantially the largest sand size upon which a filter cake of good integrity can accumulate. Use of sands of smaller sizes affords filtered gas at lower residual dust remaining, at cost of either lower throughput or higher pressure drop in the filtered gas. For a given size of sand, to allow a filter cake to form, there are limits upon the velocity of gas entering a free face of the sand. For the 0.15–0.45 mm sand, in tests filtering a number of dusts at about 150–200° C., preferred gas-entry velocities have ranged from ~16 to ~28 cm/s (superficial velocities, from ~8 to ~14 cm/s). Herein, gas-entry velocity=rate of gas flow divided by the total nominal areas of free sand faces upon which a filter cake can accumulate. Since the profile of a gas-entry face, seen in vertical cross-section, is poorly defined, it is convenient to define a nominal area, thus:

> Gas-entry face area=(straight-line distance between the face's outer and inner edges in the direction perpendicular to the edges)×(the mean of the horizontal lengths of these edges).

(Notice that this definition applies, regardless of whether the face's edges are straight or curved in the horizontal direction. In state-of-the-art designs, edges are straight, but louvers that are circular in a plan view may be useful in some applications.) In general, a lower gas-entry velocity is preferable the smaller the size of dust to be filtered or the less cohesive the dust.

Parenthetically, I note that both larger granular material sizes and higher gas-entry velocities may be specified for panel-bed applications wherein a clean gas is treated by a contact with the granular material.

In a test of a commercial-scale panel-bed filter module, wood ash was filtered from gas at 200° C. emitted by a wood-waste boiler (H. Risnes and O. K. Sønju, Evaluation of a novel granular bed filtration system for high temperature applications, paper presented at conference on Progress in Thermal and Biomass Conversion, Tyrol, Austria, 2000). The module comprised two panel beds, each 600 mm in width and 3000 mm in height. For each bed, the projected vertical frontal area was about twice the nominal area of gas-entry faces. Thus, superficial velocity of gas was about one-half the gas-entry velocity. Gas-entry sand faces received and filtered dusty gas supplied to a space surrounding the module. In cooperation with nonporous side panels, the two panel beds enclosed a central space in which cleaned gas moved upward toward an outlet. On average, residual dust in filtered gas was 1.7 mg/Nm$^3$. This excellent filtration performance has been confirmed in tests of an installation comprising 27 substantially identical modules receiving gaseous products of combustion at 190° C. from a 5 Mw wood-waste boiler (the tests having been marred, however, by a poor choice of apparatus for separating puff-backed sand from the filtered wood ash).

At its present stage of development, the panel-bed filter with puff-back is an economically attractive choice for many applications (especially, for example, for removing ash from wood-waste combustion or silica fume arising from FeSi production). An important parameter for judging a device for removing dust from a gas is the area of ground that it occupies. The "footprint" of a state-of-the-art panel-bed filter is approximately 0.13 square meter per 1,000 cubic meters of dusty gas to be filtered per hour. In contrast, the footprint of a high-efficiency electrostatic precipitator is about 0.37 m$^2$/(Km$^3$/hr). A fabric filter's footprint is even larger.

There is, however, need for improvement. The fabricator of modules for tests on a wood-waste boiler, described above, complained at the large number of individual louver elements needing to be assembled. A higher gas-treating capacity per louver would constitute an advance in the art. In addition, cost of filter modules is a major part of the total cost of a filter installation. A larger gas-treating capacity per filter module, reducing the number of modules needed for a given application, would also advance the art.

In a second utility application filed simultaneously with the instant application, entitled IMPROVED PANEL-BED METHOD AND APPARATUS FOR GAS AND GRANULAR MATERIAL CONTACTING, (now U.S. Pat. No. 6,783,572) I disclose an advance in panel-bed art capable of achieving a four-fold or greater increase in the capacity of a panel bed of given projected vertical frontal area.

In a panel bed used as a filter, the disclosure has potential for achieving a four-fold or greater decrease in the number of individual louvers that must be manufactured and assembled, and a shrinkage in footprint from the aforementioned 0.13 m$^2$/(Km$^3$/hr) to approximately 0.09 m$^2$/(Km$^3$/hr).

The disclosure, however, has the disadvantage that the ascribed increase in capacity and shrinkage in footprint can be achieved only at cost of an increase in pressure drop. Such increase is not a significant disadvantage for panel-bed applications requiring countercurrenticity of contacting of a gas and a granular medium; but where a large flow of a dusty gas must be cleaned by filtration, the increase in pressure drop can be costly. Accordingly, the disclosure of my second utility application of today's date leaves open a place for an arrangement that increases filtration capacity while not incurring this penalty.

SUMMARY OF THE INVENTION

I have discovered a panel arrangement for cake-forming granular-bed filtration affording a significant increase in filtration capacity over the prior art while at the same time reducing the pressure loss in the filtered gas. I provide below a table comparing capabilities of several approaches to cake-forming granular-bed filtration. In the table, values for current state-of-the-art panel-bed filtration are expressed as 100%. The table assumes use of filter modules 3,000 mm in height and operating at the same granular-bed gas-entry velocity. A module comprises two panels with filtration faces oriented in opposite directions.

|  | Current state of panel-bed art | The aforementioned disclosure of today's date | The instant invention |
|---|---|---|---|
| Number of gas-entry faces per module | 100% | ~100% | ~15% |
| Number of modules | 100% | ~25% | ~17% |
| Footprint | 100% | ~70% | ~50% |
| Clean-bed pressure drop | 100% | ~400% | ~75% |

In the new arrangement, a number of relatively shallow beds of granular material ("filter trays") are disposed substantially vertically to form a "panel." The trays incline at an angle below the dynamic angle of repose of the granular material. In each tray, an inclined porous plate supports a bed of the material. The bed presents a free face across which gas enters the bed. The gas-entry face has a lower edge and an upper edge. Associated with each plate are superjacent and subjacent nonporous plates. A generally vertical dusty-gas-distribution compartment is situated nearby the lower edges of the filter-tray beds. The space between a bed's gas-entry face and its superjacent nonporous plate neighbor communicates with and receives gas from the dusty-gas-distribution compartment. Gas moves from this space across the bed's gas-entry face, passes in the downward direction across the bed, and leaves the bed via its supporting porous plate. The gas is filtered, depositing dust in a filter cake supported by the gas-entry face of the bed. The space between a porous plate and its subjacent nonporous plate neighbor communicates with a generally vertical cleaned-gas-collection compartment.

At intervals, the flow of dusty gas is interrupted, and there is created a momentary en masse displacement of the granular material respecting each supporting porous plate, causing both filter cake and a moiety of the material to spill from each free gas-entry face. Passages are provided placing each filter-tray bed in communication with an elevated source of the granular material. Permanently occupying these passages is granular material that, most of the time, is stationary. During a brief interval following the renewal of filtration faces, material descends by gravity from the elevated source through the passages to make good losses from the filter trays and to renew the gas-entry faces.

Two methods are disclosed for face renewal.

In one method, a momentary reverse transient surge flow of gas across the panel (a "puff-back") creates the aforementioned en masse displacement. If bed depth is substantially the same at inner and outer edges, this method creates en masse displacement that is particularly uniform across a gas-entry face, and so the depth of a surface layer of the material that spills from the bed is also substantially uniform. State-of-the-art panel-bed filters employing puff-back face renewal do not achieve a comparable degree of uniformity.

A second method, also causing a substantially uniform surface layer to spill from the bed, employs a sharp upward blow of a hammer to move the porous bed-supporting plates smartly upward. Because a porous plate is inclined, its upward motion causes the granular-material bed supported thereupon to shift toward the lower edge of its gas-entry face. When this method is used, it is less important that bed depths at the bed's inner and outer edges be substantially equal, although such equality remains an advantage, since it promotes a relative uniformity in flow of dusty gas entering all parts of the bed's free face. For convenience of reference, I sometimes use the term "hammer-blow renewal of gas-entry faces"; but it should be understood that means other than a hammer blow may induce a suitable, momentary, sharp vertical movement of bed-supporting plates.

Hammer-blow renewal of gas-entry faces has the advantage of allowing assembly of a filtration module requiring a smaller footprint than that required for a module with face-renewal by puff-back. Desirably, for a design employing hammer-blow renewal, flow of gas is upward in both the dusty-gas-distribution compartment and cleaned-gas-collection compartment, and it is advantageous that these two compartments, respectively, contract and expand in horizontal cross-section with increase in elevation.

An object of the invention is to provide a method and apparatus for cleaning a gas containing fine particulate matter ("dust").

Another object is to provide a gas filter suitable for operation at an extremely high temperature, e.g., at beyond 1000° C.

My invention relates to the cleaning of dusty gas by removing fine particulate matter therefrom. Granular material is arranged in a panel of substantially vertically disposed beds, each supported by a transversely inclined porous plate, and each presenting an inclined free face. Passages are provided that place each of the granular beds in communication with an elevated space containing granular material and capable through action of gravity of supplying the material to the bed on demand. Dusty gas is caused to flow forwardly from a dusty-gas-distribution compartment nearby the lower edges of the beds and into each bed across its free face. Dust is thereby filtered from the gas and accumulates upon the free face to form a filter cake. Cleaned gas leaves the bed across the inclined porous plate and enters a clean-gas-collection compartment. Thereafter, each gas-entry face is renewed by causing en masse displacement of the granular material in each bed respecting its supporting porous plate. The displacement causes a moiety of the granular material as well as the filter cake to spill from this face, thereby creating demand for supply of the granular material via the aforementioned passages.

My invention also relates to apparatus for cleaning a dusty gas by removing fine particulate matter therefrom. There is provided an upwardly extending assembly of filter trays, each tray having an inclined porous supporting plate having lower and upper edges. A dusty-gas-distribution compartment, situated nearby the lower edge of each porous plate, is in flow communication with a space above each filter tray. A cleaned-gas-collection compartment is in flow communication with a space beneath each tray. There is an inlet for admitting dusty gas into the dusty-gas-distribution compartment, and an outlet for removing gas from the cleaned-gas-collection compartment. There are closure means closing the aforementioned spaces against passage of gas from the dusty-gas-distribution compartment to the cleaned-gas-collection compartment except through the porous plates. Gravity feed passages supply a loose granular material to beds supported by the porous plates, the passages being disposed in a way such as to substantially prevent gas from flowing through granular material contained therein. Means are provided for creating en masse displacement of granular material in each bed respecting its supporting porous plate, the displacement causing a moiety of the granular material to fall away from each bed's free face, whereupon a flow of material from the gravity feed passages make good loss of material from each bed.

These and further and other objects and features of the invention are apparent in the disclosure, which includes the above and ongoing written specification, with the claims and the drawings.

BRIEF DESCRIPTION OF THE DRAWINGS

The invention will be more particularly described in conjunction with the following drawings wherein.

DETAILED DESCRIPTION OF PREFERRED EMBODIMENTS

Figures 1, 2:
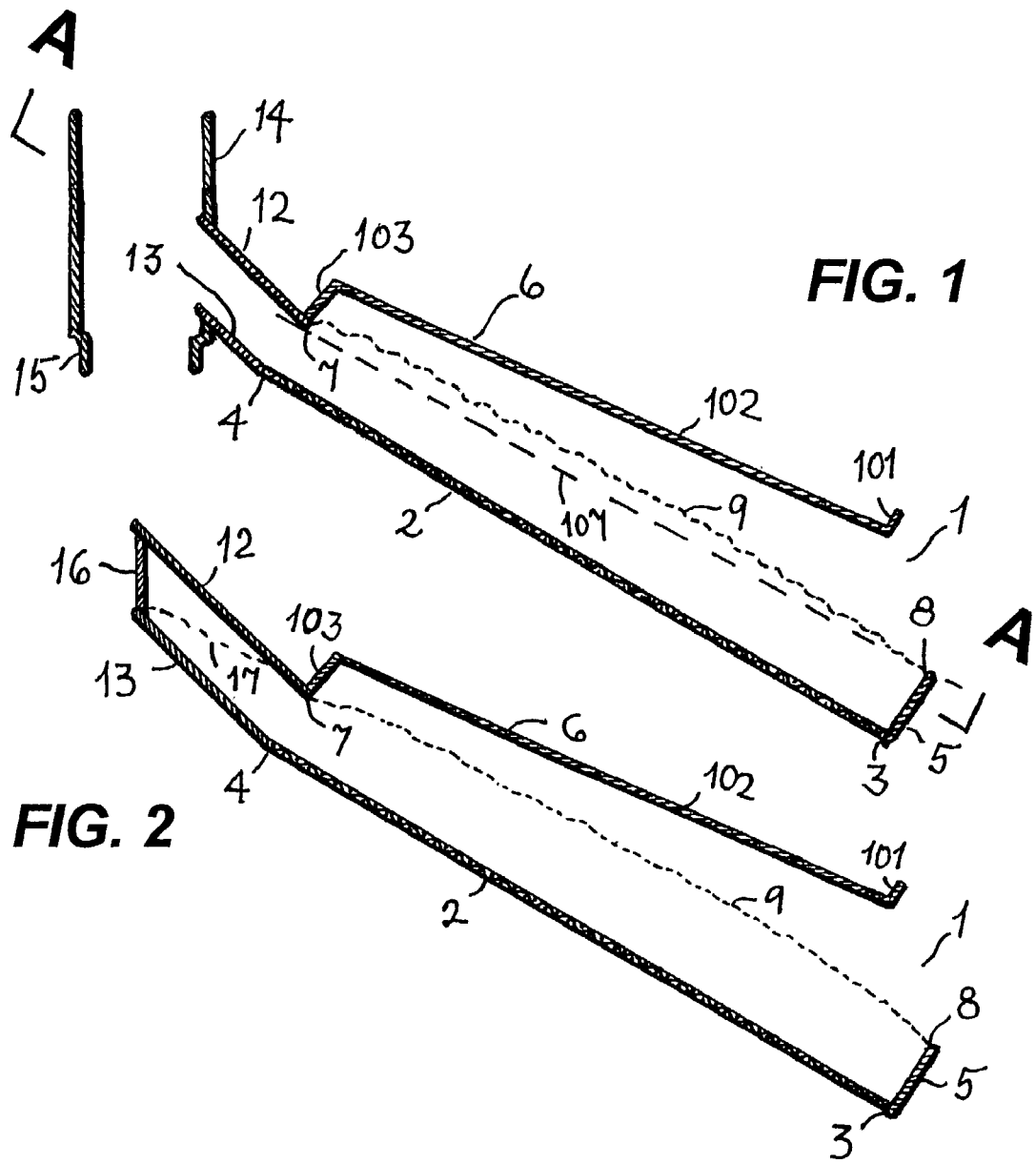
FIGS. 1 and 2 are vertical sections of a filter tray through sections B—B and C—C, respectively, indicated in FIG. 3.

In the several figures, like reference numerals refer to like parts having like functions.

FIG. 1 is a vertical section through an individual filter tray 1 (absent granular material), in which there is a granular-material-supporting porous plate 2 inclined at an angle to the horizontal and having a lower, outer edge 3 and an upper, inner edge 4. In FIG. 1, plate 2 is shown as a screen with openings smaller than the granular material to be retained. Other permeable materials may sometimes be preferred for use in plate 2. For example, in a filter-tray panel intended to filter gas at a temperature beyond 1,000° C., use of a porous sintered ceramic plate is advantageous. For retaining granular medium upon plate 2, nonporous plate 5, articulating with edge 3, presents an upper edge 8 for retaining the outer edge of a bed of granular medium that will rest upon plate 2 (whose face will be approximately as shown by dashed curvilinear line 9 in FIG. 1). Nonporous plate member 6 comprises four articulating segments, 101, 102, 103, and 12. The function of segment 101 will be described below (in connection with FIG. 4). The bend at which segment 103 articulates with segment 12 defines the inner edge of a bed of granular medium that will rest upon plate 2. In vertical section, the inclination of the dashed straight line 107 intersecting the upper edge 8 of plate 5 and the aforementioned bend is at an angle with the horizontal less than the dynamic angle of repose of the granular material that will rest upon plate 2. Plate segment 12 preferably inclines at an angle of at least 45° to horizontal. Nonporous plate 13 articulates with inner edge 4 of plate 2 and is generally parallel to plate segment 12. Segment 12 and plate 13 fit into a slanting slice removed from vertical pipe 14, the slice preferably extending to approximately the center line of pipe 14. In a short segment 15 at the lower end of pipe 14, the pipe presents a smaller diameter, the outer diameter of segment 15 matching the inner diameter of the major portion of pipe 14. In a completed panel of filter trays, pipe 14 and the space between plate segment 12 and plate 13 will be full of granular material.

Figure 3:
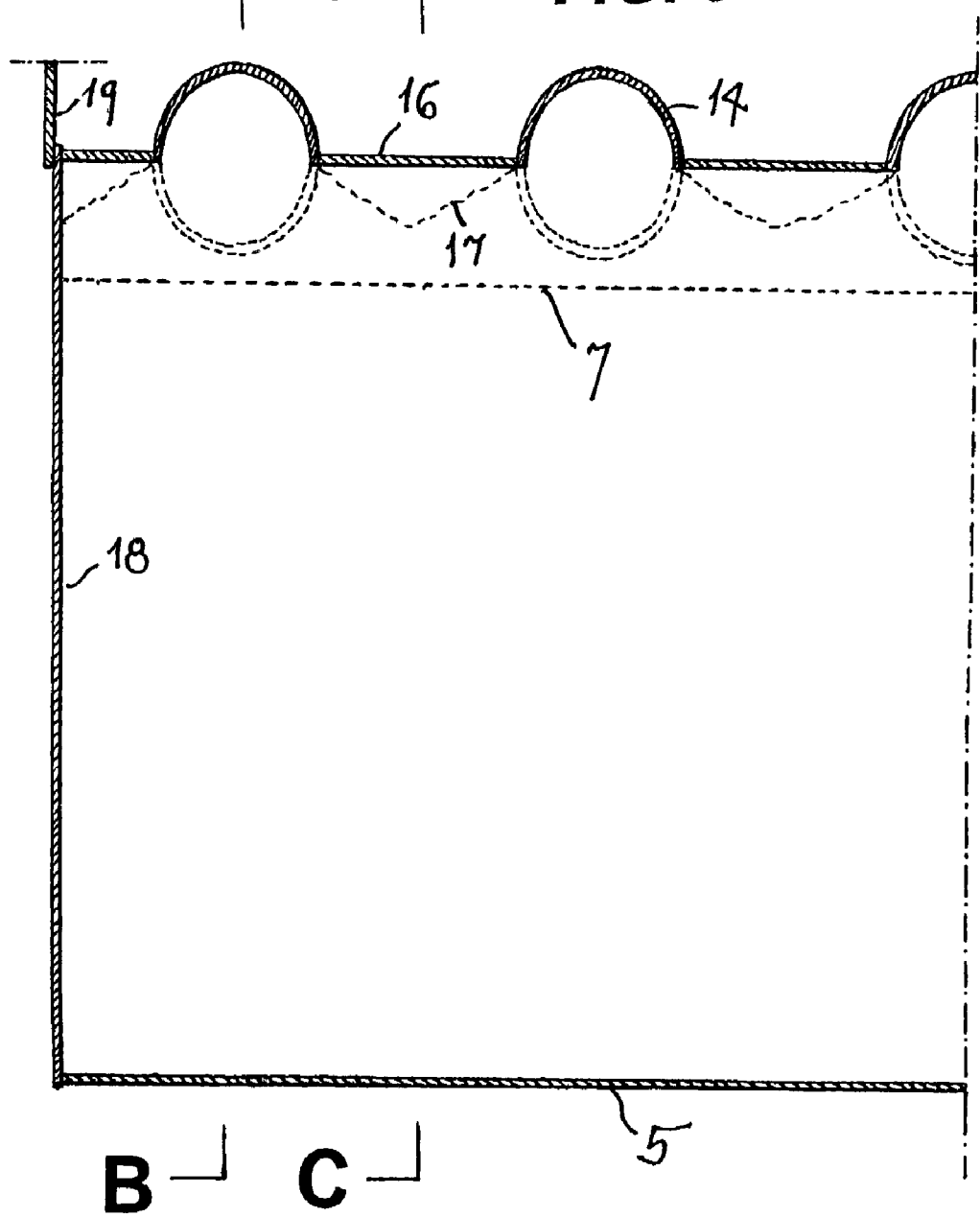
FIG. 3 is a slanting section, drawn through section A—A, indicated in FIG. 1.

FIG. 3 is a slanting section drawn through section A—A in FIG. 1. FIG. 1 is drawn through section B—B in FIG. 3. FIG. 2 is drawn through section C—C in FIG. 3. Where a plate 13 and a segment 12 of plate member 6 meet a pipe 14, they fit around the pipe's outer diameter.

FIG. 2 will now be described. Between pipes, plate 13 and plate segment 12 extend to a plane passing through inner edges of the aforementioned slanting slice removed from a pipe 14. Between adjacent pipes 14, nonporous vertical plate 16 articulates with an inner edge of plate segment 12 of plate member 6 and with an inner edge of plate 13.

In FIGS. 2 and 3, dashed curvilinear line 17 shows the approximate location of the surface of a bed of granular medium that will occupy the space between plate segment 12 and plate 13 and between adjacent pipes 14.

In FIG. 3, plate 18 is a side-closure of a panel of vertically disposed filter trays. Plate 19 is a side-closure of a module comprising two panels of filter trays facing in opposite directions. It will be understood that FIG. 3 depicts the left-hand portion of a filter-tray-panel module, a comparable right-hand portion also being fitted with side-closure plates 18 and 19.

Figure 4:
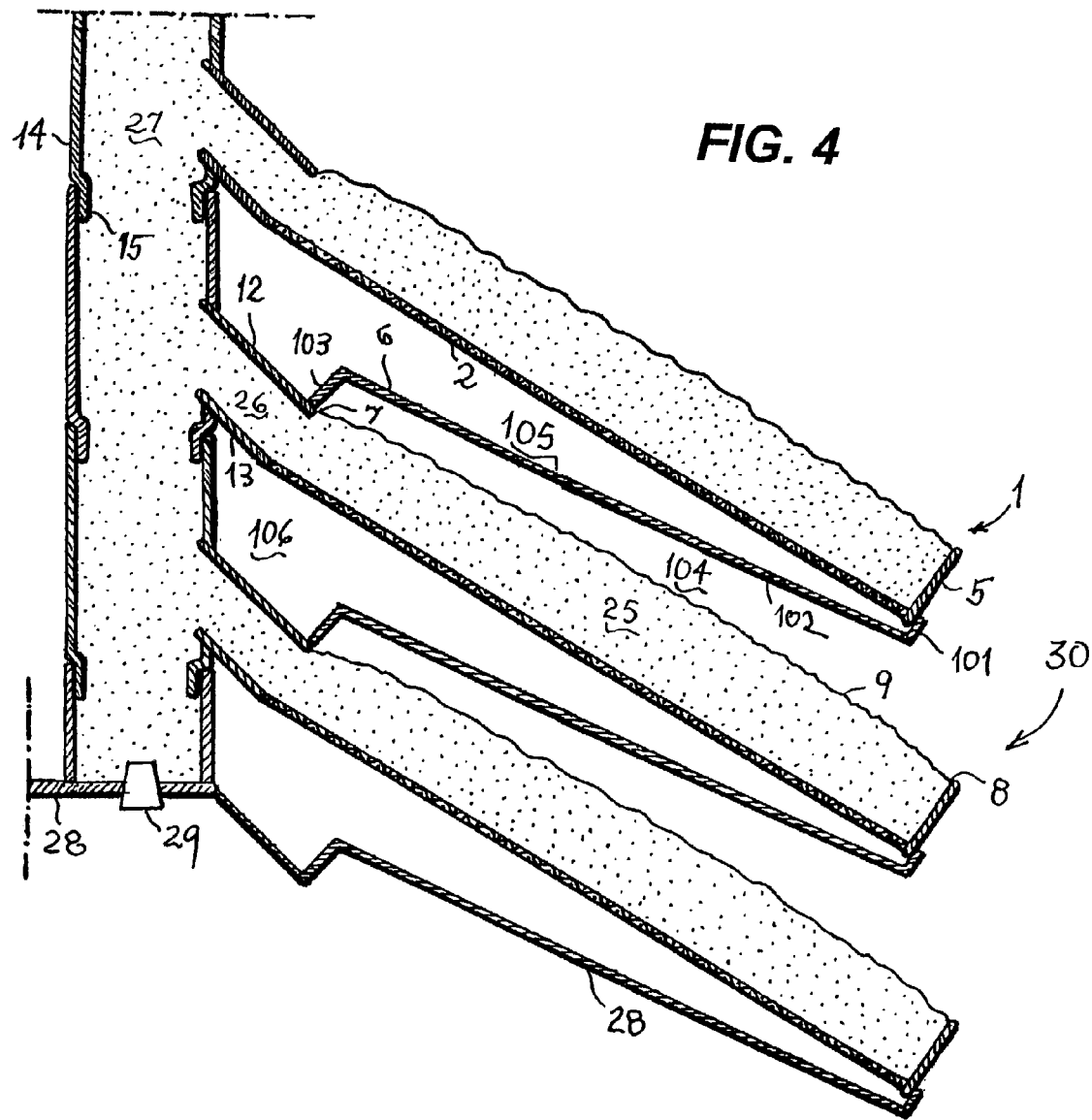
FIG. 4 illustrates, in a vertical section, an assembly of three filter trays at the bottom of a panel of trays shown in a manner pertaining to vertical cross-section B—B, indicated in FIG. 3.

FIG. 4 illustrates, in a vertical section, the vertical disposition of filter trays 1 to constitute vertical panel 30 comprising a relatively large number of filter trays 1. FIG. 4 pertains to section B—B in FIG. 3. An outer plate 5 of one filter tray articulates with the outer segment 101 of the plate member 6 of the next subjacent filter tray. In assembling a panel, a linear weld can make good the connection of a plate segment 101 with plate 5. When granular medium is supplied to the panel (as hereinafter described), bed 25 forms upon support plate 2. Bed 25 presents a lower edge at upper edge 8 of plate 5 and an upper edge 7 defined by the junction of segments 12 and 103 of plate member 6. Preferably, the depth of bed 25 is substantially the same at its upper and lower edges. Bed 26 occupies the space between plate 13 and a segment 12 of plate member 6, also, granular medium bed 27 occupies pipes 14 and extends vertically to the full height of panel 30.

Segment 15 of one pipe 14 articulates with the upper end of the next subjacent pipe 14, providing a tight connection of the two pipes 14. The connection need not be strictly gas-tight. A partial circular weld can make good the connection from a mechanical standpoint.

FIG. 4 illustrates how segment 102 of a plate member 6 together with face 9 of subjacent bed 25 define space 104, a pathway for flow of a dusty gas toward gas-entry face 9 of bed 25. FIG. 4 also illustrates how segment 102 of a plate member 6 together with a superjacent porous support plate 2 define space 105, a pathway for flow of filtered gas away from the plate 2 and toward a pipe 14. Space 106, between a plate 13 and a subjacent segment 12 of a plate member 6, articulates with space 105 and extends the aforementioned pathway for flow of filtered gas toward a pipe 14.

FIG. 4 depicts the lowermost three filter trays of panel 30. Plate 28 terminates the panel at its bottom. As generally depicted (and as will be elucidated in connection with FIG. 7), plate 28 is common to the two filter-tray panels of a filter module.

Figure 5:
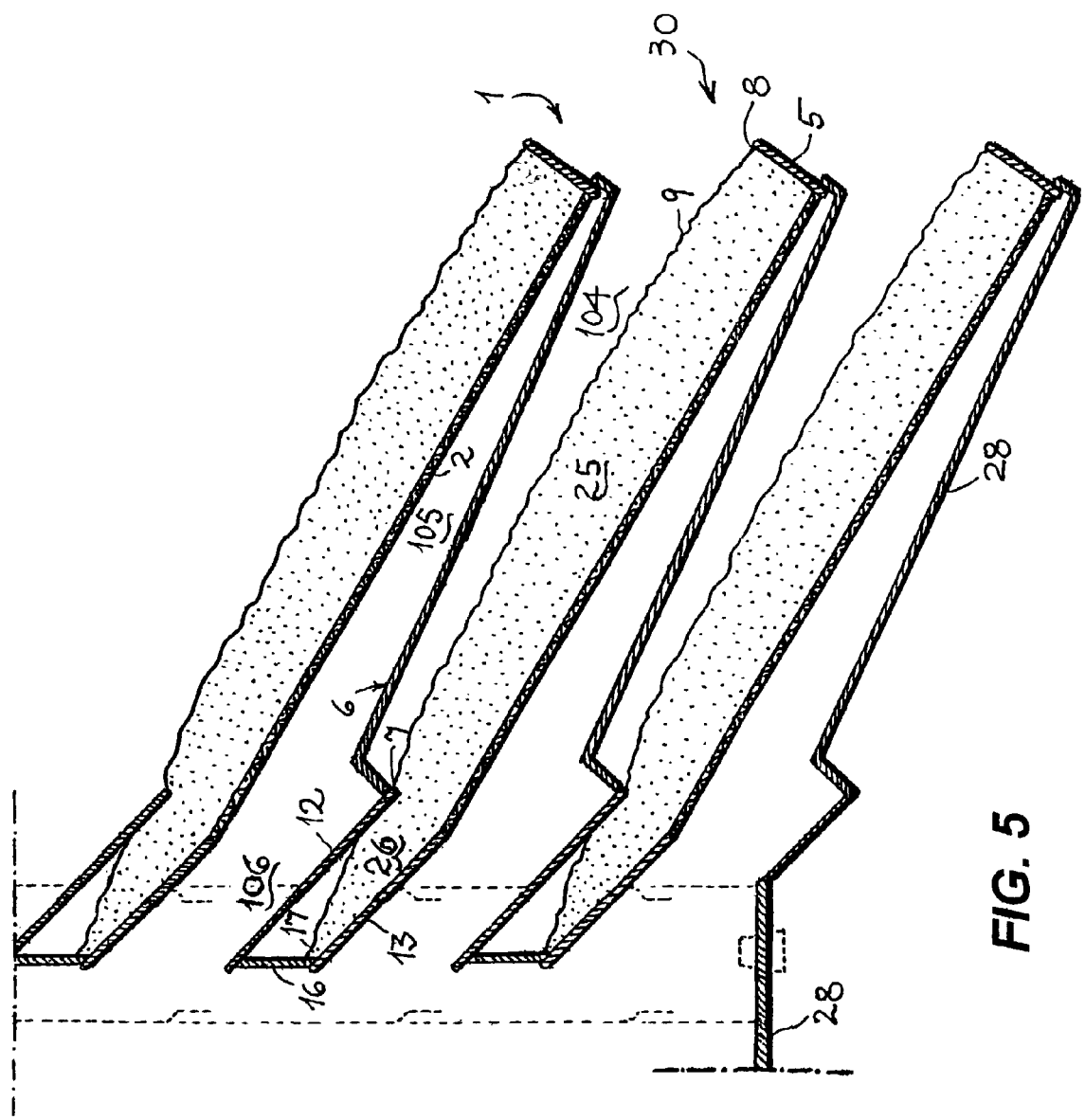
FIG. 5 illustrates, in a vertical section, an assembly of three filter trays at the bottom of a panel of trays shown in a manner pertaining to vertical section C—C, indicated in FIG. 3.

FIG. 5 also illustrates, in vertical section, the vertical disposition of filter trays 1 to constitute panel 30. FIG. 5 pertains to section C—C in FIG. 3. Like FIG. 4, FIG. 5 depicts the lowermost three trays of panel 30. FIG. 5 illustrates how the aforementioned pathway for flow of filtered gas extends unhindered through a gap between adjacent pipes 14. For each bed 25 of panel 30 (save the bottommost), bounding this path are plate 2, the plate 13 articulating therewith, and a subjacent plate member 6. For the bottommost bed 25, bounding the path are plate 2, the plate 13 articulating therewith, and bottom closure plate 28.

As drawn in FIGS. 4 and 5, panel 30 presents a total nominal gas-entry-face area more than three times larger than the panel's projected vertical frontal area.

Figure 6:
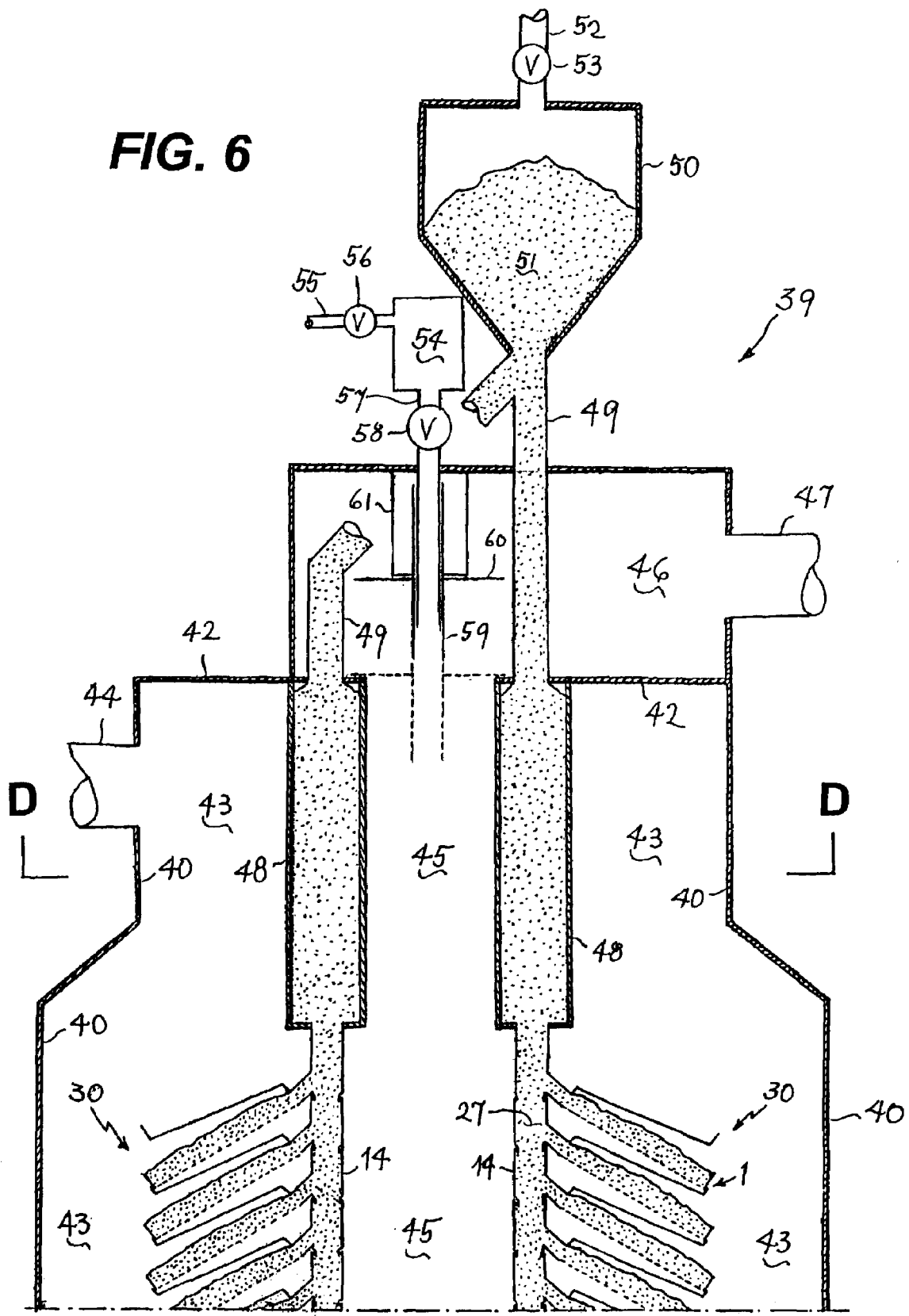
FIG. 6 is a vertical section near the top of a filter employing puff-back for renewal of gas-entry faces of filter trays.

FIG. 6 depicts schematically, in a vertical section, a top portion of gas filter 39, fitted with a pair of panels 30 facing in opposite directions and fitted for gas-entry face renewal by means of puff-back. Filter trays in FIG. 6 are drawn in the manner illustrated in FIG. 4.

A granular material is supplied to filter 39 via pipe 52 and valve 53. From pipe 52, the material enters hopper 50, forming bed 51. From bed 51, on demand, the material moves downward by gravity flow via pipes 49 and bin-spaces 48 into pipes 14, from which it moves into each filter tray of each panel 30.

Dusty gas reaches filter 39 via pipe 44, entering dusty-gas-distribution compartment 43, bounded by side plates 40 and 41 (the latter seen in FIG. 8), top plate 42, bin-spaces 48, panels 30, and side-closure panels 18 and 19 (seen in FIG. 3). In compartment 43, gas to be filtered moves downward, a small portion of this gas entering each gas-entry face presented by a panel 30. Filtered gas moves from each panel 30 into cleaned-gas-collection compartment 45, wherein the gas moves upward into chamber 46. From chamber 46, filtered gas exits filter 39 via pipe 47. In particular, be it noted that the flow of filtered gas from a plate 2 toward and into cleaned-gas-collection compartment 45 is not obliged to travel across a passage containing stationary granular material held in reserve to meet a demand for renewal of the free face 9 of a filter tray 1.

With reference again to FIGS. 3, 4, and 5, note that plate member 6, in cooperation with plates 18 and 19, provides a closure means that prevents dusty gas from flowing from compartment 43 into compartment 45 except through a bed 25 and across a porous plate 2.

Operation of filter 39 is cyclical. The cycle includes a relatively long filtration interval and a brief face-renewal interval. Near the beginning of the filtration interval, valve 56 is opened, connecting chamber 54 to a source of gas at high pressure via pipe 55. When the gas pressure in chamber 54 achieves the pressure of the source, valve 56 is closed. In the filtration interval, with selection of an appropriate rate of flow of the dusty gas and an appropriate size of the granular material, a deposit of dust (i.e., a "filter cake") accumulates at each gas-entry face 9. The face-renewal interval is inaugurated when filter cakes reach a desired "thickness" (i.e., a desired weight of dust per unit free face area). Knowledge that filter cakes of desired thickness have accumulated can be gained by observing drop in pressure from pipe 44 to pipe 47. At the commencement of the face-renewal interval, mechanism 61 (to be elucidated in connection with FIG. 9) lowers pipe 59 and plate 60 into the position indicated by dashed lines in FIG. 6, thereby stopping flow of dusty gas into filter 39. Valve 58 is then quickly opened, allowing gas from chamber 54 to dump into cleaned-gas-collection compartment 45 and thereby creating a reverse transient surge flow of gas from compartment 45 into compartment 43 (i.e., a puff-back). The puff-back produces en masse displacement of the granular material in beds 25 toward gas-entry faces 9, causing filter cake together with a moiety of the granular material to spill into dusty-gas-distribution compartment 43. Thereby, each gas-entry face 9 is renewed; and, by action of gravity, granular material descends from pipes 14 into each bed 25 of each panel 30 to make good loss of granular material therefrom. After a short interval, mechanism 61 raises pipe 59 and plate 60 into the positions shown by solid lines in FIG. 6, thereby causing dusty gas again to flow into filter 39.

Figure 7:
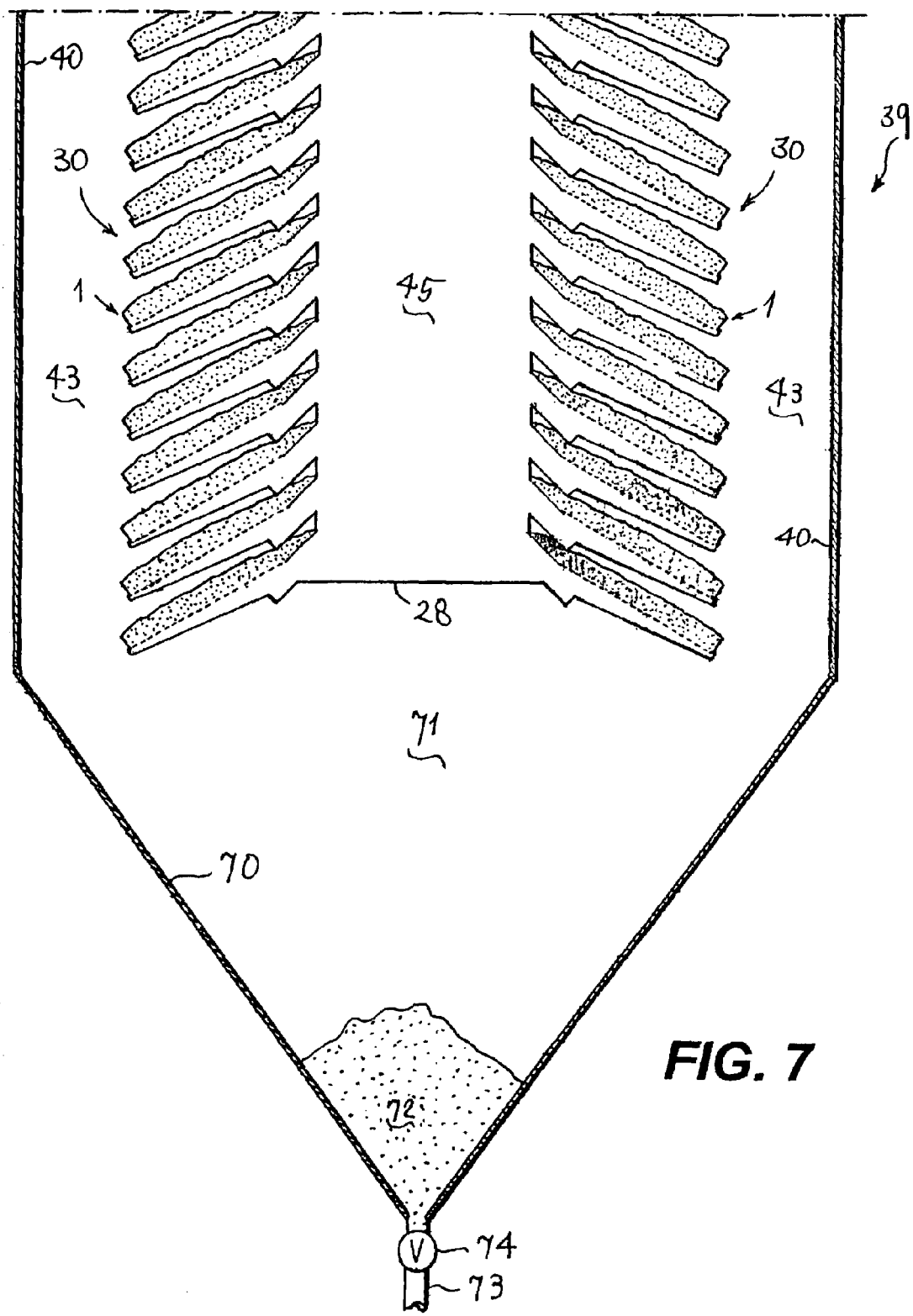
FIG. 7 is a vertical cross-section near the bottom of a filter employing puff-back for renewal of gas-entry faces of filter trays.

FIG. 7 depicts schematically, in a vertical section, a bottom portion of gas filter 39, fitted with a pair of panels 30 facing in opposite directions and fitted for gas-entry face renewal by means of puff-back. Filter trays in FIG. 7 are drawn in the manner illustrated in FIG. 5. Situated beneath plate 28 is hopper 70, providing space 71 serving for the accumulation of granular material together with dust cake in heap 72. The accumulated material and dust can be withdrawn via pipe 73 by opening valve 74. The material and the dust can be separated, and relatively dust-free material can be re-used by returning it to hopper 50 (seen in FIG. 6). In some instances (e.g., the fine silica dust from FeSi production), the dust may have economic value if maintained in a pure condition. In such instances, the granular material of gas filter 39 may advantageously comprise pellets of the same solid chemical species as the dust to be captured. An alternative is employment of an especially robust granular material, one that resists breakage when dropped upon a hard surface. So-called "Master Beads" of crude alumina (produced by Norton-Alcoa) are suitably robust.

Figure 8:
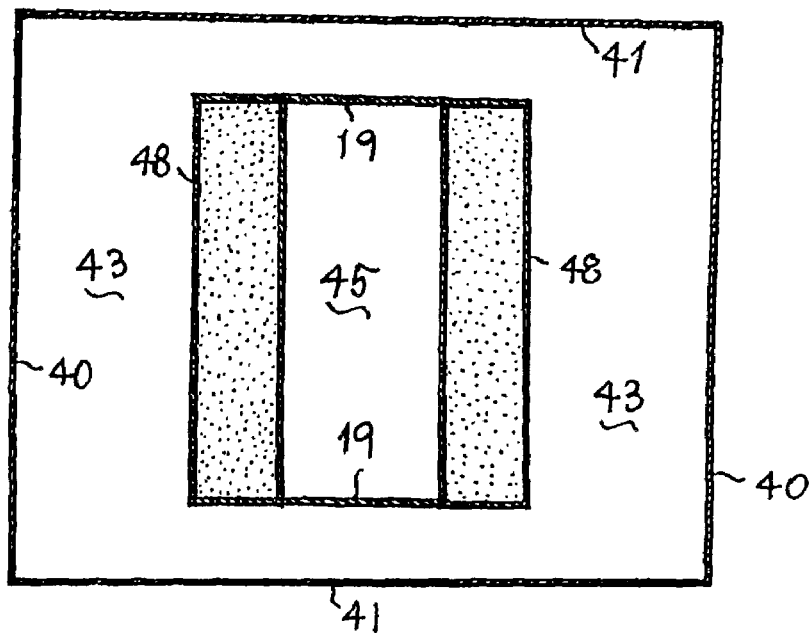
FIG. 8 is horizontal section D—D, indicated in FIG. 6.

FIG. 8, drawn through horizontal cross-section D—D in FIG. 6, elucidates the closure of dusty-gas-distribution compartment 43.

Figure 9:
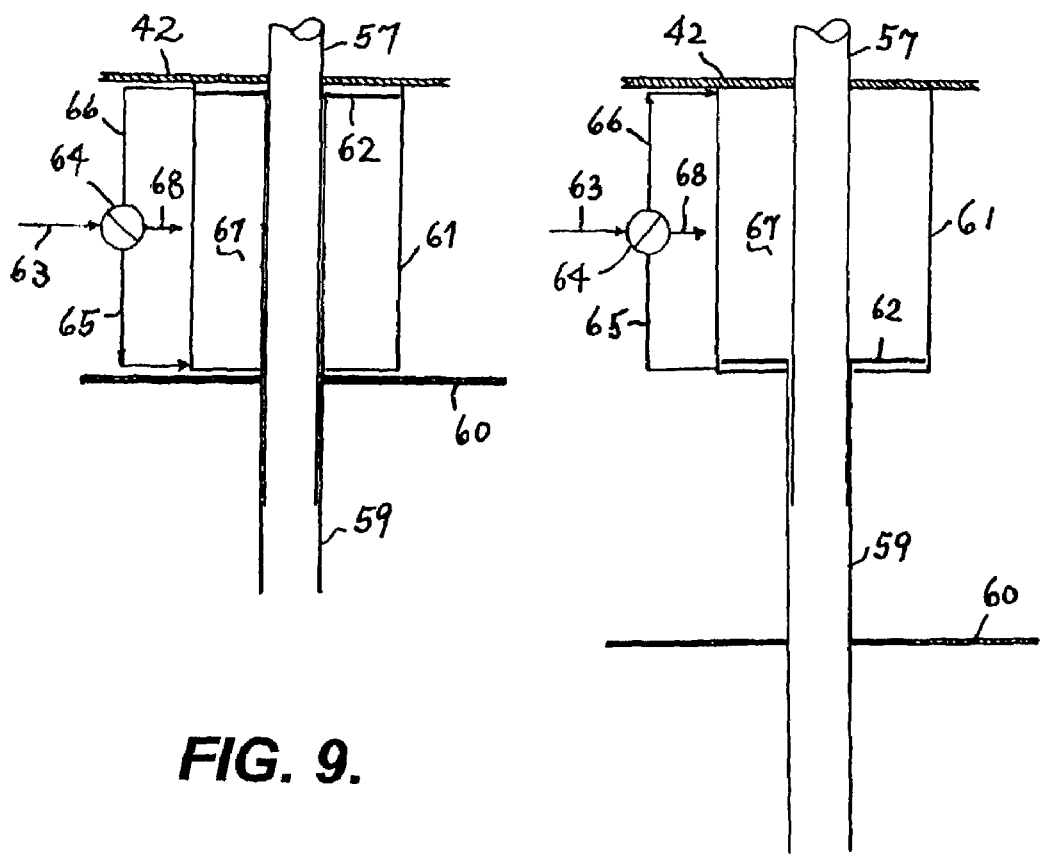
FIG. 9 shows a mechanism for top-closure of the cleaned-gas-collection compartment seen in FIG. 6.

The two sketches in FIG. 9 schematically elucidate the mechanism 61 for raising and lowering pipe 59 and plate 60 in FIG. 7. Gas at high pressure reaches space 67 from line 63 via four-way valve 64. When valve 64 is disposed as shown in FIG. 9's left-hand sketch, gas in space 67 drives annular plate 62 to the top of the space, while open line 68 reduces the pressure above plate 62 to atmospheric. When valve 64 is shifted to the disposition shown in FIG. 9's right-hand sketch, gas in space 67 drives plate 62 downward, and open line 68 reduces the pressure below plate 62 to atmospheric.

Figure 10:
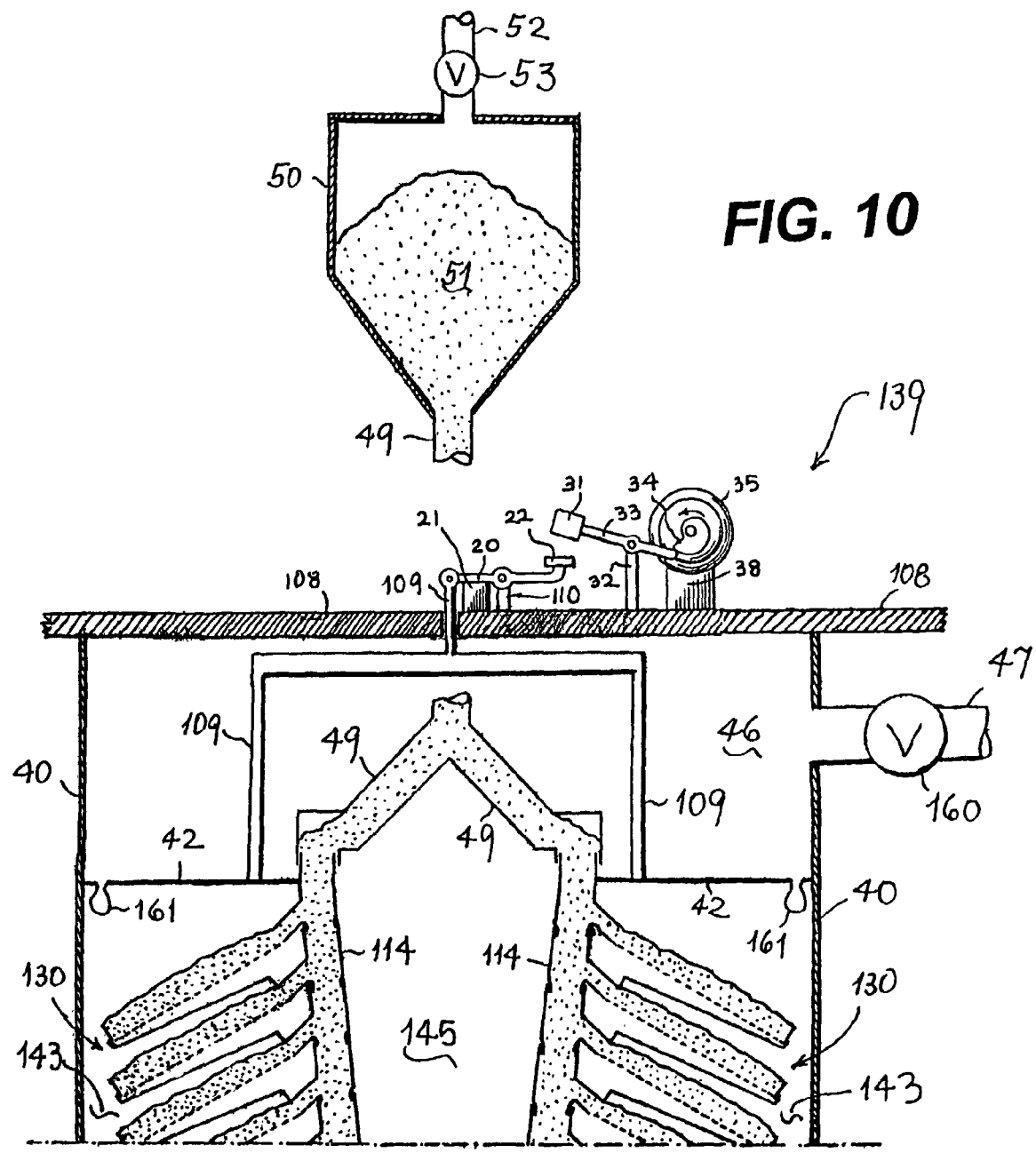
FIG. 10 is a vertical section near the top of a filter employing a hammer upblow for renewal of gas-entry faces of filter trays.
Figure 11:
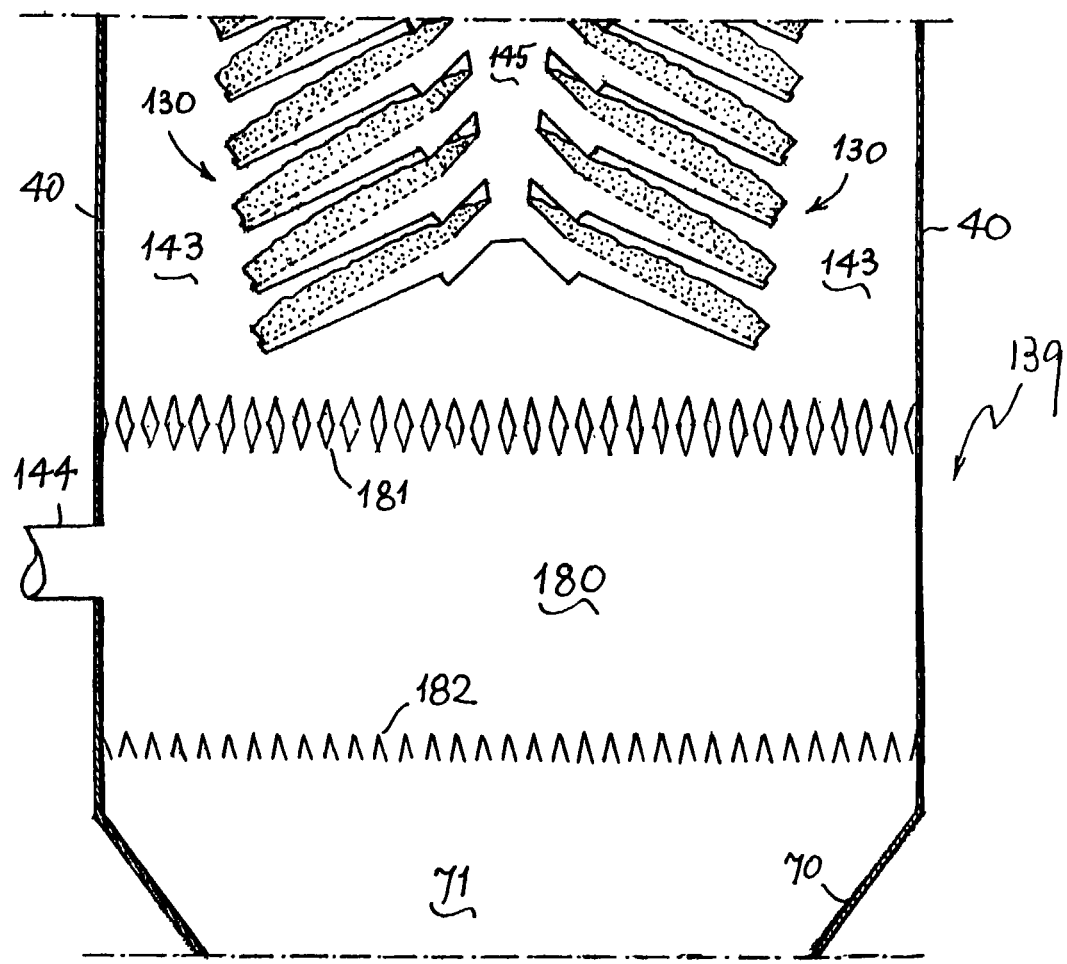
FIG. 11 is a vertical section near the bottom of a filter employing a hammer upblow for renewal of gas-entry faces of filter trays.

FIGS. 10 and 11 depict, schematically, top and bottom portions, respectively, of filter 139, which is fitted with a module comprising two panels 130 and is fitted for gas-entry face renewal by means of the blow of a hammer.

Panels 130 and pipes 114 (supplying granular material to panels 130 from hopper 50 via pipes 49) are substantially identical to the panels 30 and pipes 14 previously described, with one small change. In panels 130, each given filter tray and its next subjacent tray are disposed at a slight horizontal offset, so that the outer edge of the granular-material bed within the given tray extends a little beyond the outer edge of the bed in the next subjacent tray. Accordingly, dusty-gas-distribution compartment 143 in filter 139 is tapered in a vertical section, narrow at its top (seen in FIG. 10) and wide at its bottom (seen in FIG. 11). Also, cleaned-gas-collection compartment 145 is tapered in a vertical section, wide at its top (seen in FIG. 10) and narrow at its bottom (seen in FIG. 11). Corresponding to the horizontal offsets of the filter trays in panels 130, pipes 114 supplying granular material to the filter trays are situated at a small slant from vertical.

Dusty gas is introduced into filter 139 from pipe 144, seen in FIG. 11. Space 180 is provided between two horizontal sets of baffles, an upper set 181 (diamond-shaped in vertical cross-section) and a lower set 182 (V-shaped in vertical cross-section, the point of the Vs facing upward). In space 180, a relatively high-velocity jet of gas from pipe 144 causes a random turbulence to develop in a region surrounding the jet. Baffles 181 tend to protect gas-entry faces of panels 130 from erosion by high-velocity strands of gas arising from this turbulence. Baffles 182 tend to prevent a re-entrainment of dust from an accumulation of dust and granular material in hopper 70.

Operation of filter 139 is cyclical, a filtration interval alternating with a face-renewal interval. Face-renewal is accomplished through a hammer blow imparting a sharp vertically upward motion to plates 2 supporting granular-material beds 25. The motion creates en masse displacement of granular material respecting bed-supporting plates 2. For best practice, the strength of the hammer blow should be such as to impart an upward acceleration to plates 2 that is greater than the acceleration of gravity, so that each granular-material bed 25 lifts away from the plate 2 on which it rests. This action creates a temporary gap between plate and the bed. The action, however, does not produce a motion of the bed that is precisely vertical. The bed moves perpendicularly to the slope of the plate 2 on which the bed formerly was at rest. When the gap forms, the bed motion has both a vertical and a horizontal component, the latter component moving the bed toward its lower edge (at 8, seen in FIGS. 4 and 5). Next, action of gravity causes the bed to fall perpendicularly downward into renewed contact with its supporting plate 2. The combined effect of lateral movement and subsequent gravity-induced fall is to produce a uniform shift of the granular-material bed toward its lower, outer edge. This shift cause a substantially uniform layer of the bed's free face along with filter cake to drop away from the edge and to fall downward through compartment 143.

Bar-assembly 109, attached to top plate 42 of a module comprising the two panels 130, supports the weight of the module. Bar-assembly 109 is supported by an arm of horizontal lever 20, which is supported by column 110 resting upon supporting floor 108. Sharp vertically upward motion of plates 2 of filter-panels 130 is effected by causing hammerhead 31 to strike pad 22 on lever 20 at the end opposite from that which supports bar 109. The strike occurs when rotary motion of eccentric cam 34 releases lever 33, allowing hammerhead 31 to fall. When this occurs, the arm of lever 20 that articulates with bar 109 lifts away from column 21, which rests upon supporting floor 108. Thereby, the hammer blow imparts a sharp vertically upward motion to plates 2. Springs 161 absorb the motion. They should display a stiffness such that the panel bed returns to its normal vertical position promptly, thereby bringing the aforementioned arm of lever 20 again into contact with column 21. Shock-absorbing characteristics of column 21 are preferably such that the panel bed returns to its normal vertical position "cleanly" (i.e., without prolonged "chatter" after lever 20 and column 21 again come into contact). Lever 33 is supported by vertical bar 32 resting upon floor 108. Motor 35, supported by column 38 resting upon floor 108, turns cam 34. Further rotation of eccentric cam 34 serves to raise hammer head 31, placing it in a position for another strike upon pad 22 at the conclusion of the next filtration interval in the cycle of operation.

A sharp downward motion of supporting plates 2 (such as could be effected by means of a downward blow of a hammer) can also serve to renew gas-entry faces 9, but only if at least one of two special circumstances obtain.

First, a sharp downward motion can be effective if the downward outward slope of supporting porous plates 2 is sufficient. A sharp downward motion places granular beds 25 momentarily in mid-air suspension, causing a spill of the material over top edges 8 of bed-retaining plates 5 (seen in FIGS. 4 and 5). Beds 25 then fall directly downward, again coming at rest upon supporting plates 2. Next (but only if these plates are sufficiently steep), action of gravity may displace beds 25 toward outer edges 8. If plate slope is shallow, however, such gravity-induced displacements will not occur, and permanent regions of never-displaced material will form within beds 25. Such material, over time, would harm filtration performance through a gradual accumulation of dust therein, tending to block flow of gas across the beds 25.

Second, a sharp downward motion can be effective if springs 161 return supporting plates 2 smartly to their normal position. If their return upward is sufficiently smart, the motion can provide, in effect, a clearing of beds 25 through a desirably sharp upward motion.

For fixed panel height, rate of gas flow per panel, and tray dimensions, filter 139 of FIGS. 10 and 11 has a smaller footprint than filter 39 of FIGS. 6 and 7. This is an advantage for hammer-blow gas-entry face renewal over puff-back. Experience has shown that the effectiveness of puff-back suffers if tapered dusty-gas-distribution and cleaned-gas-collection compartments are provided.

Hammer-blow renewal of gas-entry faces has yet another potential advantage. Puff-back renewal of state-of-the-art panel-bed filters has been successfully practiced for panels as tall as 3,000 mm. Although the practice could no doubt be successful for even taller panels, this is probably not so without limit. I see no physical limit for success of hammer-blow face renewal, however tall a panel might be specified. Lack of such a limit helps a designer wishing to construct a filter of the instant invention with a footprint sufficiently small to fit into a highly constricted ground plan.

I do not wish my invention to be limited to the particular embodiments illustrated in the drawings and described above in detail. Those skilled in the art will recognize other arrangements as well as combinations of the instant invention with other adaptations or applications of a panel filter for face-renewal through body movement of granular material toward gas-entry faces, such as a panel-bed filter with electrostatic boost (U.S. Pat. No. 3,926,587, Dec. 16, 1975); treating gas and wetted granular material (U.S. Pat. No. 3,987,148, Oct. 19, 1976); treating gas with catalytic dust (U.S. Pat. No. 3,957,953, May 18, 1976); filtering micron-size aerosol using precoated panel bed (U.S. Pat. No. 3,926,593, Dec. 16, 1976); treating gas with chemically active dust coating gas-entry faces of panel bed (U.S. Pat. No. 3,928,532, Dec. 23, 1975).

While the invention has been described with reference to specific embodiments, modifications and variations of the invention may be constructed without departing from the scope of the invention, which is defined in the following claims.

I claim:

1. A method of cleaning a dusty gas by removing fine particulate matter therefrom, comprising:
    a) arranging granular material in a panel of substantially vertically disposed beds, a transversely inclined porous plate supporting each said bed, each having a lower edge and an upper edge and presenting an inclined free face;
    b) providing passages that place each of said beds in communication with an elevated space containing said granular material and capable through action of gravity of supplying said material to said bed on demand;
    c) providing neighboring transverse nonporous plates above and below each said porous plate;
    d) forwardly flowing said dusty gas from a dusty-gas-distribution compartment nearby said lower edges and into each said bed across its free face, said free face cooperating with its neighboring superjacent nonporous plate to direct the flow of said dusty gas from said dusty-gas-distribution compartment and into said free face, said dust thereby being filtered from said gas and accumulating upon said free face to form a filter cake, cleaned gas leaving said bed across said inclined porous plate, said porous plate cooperating with its subjacent neighboring nonporous plate to direct said cleaned gas to flow toward a cleaned-gas-collection compartment; and
    e) thereafter creating en masse displacement of said granular material in each said bed respecting said bed's supporting plate, said displacement causing a moiety of said granular material along with said filter cake to spill from said bed's free face, and thereby creating demand for supply of said granular material via said passages to said bed.

2. The method of claim 1 in which said cleaned gas neither enters into nor flows across nor exits from any granular material other than the material present in said bed supported by said porous plate.

3. The method of claim 1 in which the depth of each said granular-material bed is substantially the same adjacent said bed's upper and lower edges.

4. The method of claim 1 in which the total nominal area of said free faces is at least two times the projected vertical frontal area of said panel.

5. The method of claim 1 in which said en masse displacement is caused by a reverse transient surge flow of gas, moving from said cleaned-gas-collection compartment to said dusty-gas-distribution compartment.

6. The method of claim 1 in which said en masse displacement is caused by a sharp vertical motion of said inclined porous plates supporting said beds of granular material.

7. The method of claim 6 in which said sharp vertical motion is in an upward direction.

8. A method of cleaning a dusty gas by removing fine particulate matter therefrom, comprising:
   a) arranging granular material in a panel of substantially vertically disposed beds, a transversely inclined porous plate supporting each said bed, each having a lower edge and an upper edge and presenting an inclined free face,
   b) providing passages that place each of said beds in communication with an elevated space containing said granular material and capable through action of gravity of supplying said material to said bed on demand;
   c) providing neighboring transverse nonporous plates above and below each said porous plate;
   d) forwardly flowing said dusty gas from a dusty-gas-distribution compartment nearby said lower edges and into each said bed across its free face, said free face cooperating with its neighboring superjacent nonporous plate to direct the flow of said dusty gas from said dusty-gas-distribution compartment and into said free face, said dust thereby being filtered from said gas and accumulating upon said free face to form a filter cake, cleaned gas leaving said bed across said inclined porous plate, said porous plate cooperating with its subjacent neighboring nonporous plate to direct said cleaned gas to flow toward a cleaned-gas-collection compartment; and
   e) thereafter creating en masse displacement of said granular material in each said bed respecting said bed's supporting plate through action of a reverse transient surge flow of gas, moving inwardly across said bed's supporting porous plate and outwardly from said bed's free face, said displacement causing a moiety of said granular material along with said filter cake to spill from said face, and thereby creating demand for supply of said granular material via said passages.

9. A method of cleaning a dusty gas by removing fine particulate matter therefrom, comprising:
   a) arranging granular material in a panel of substantially vertically disposed beds, a transversely inclined porous plate supporting each said bed, each having a lower edge and an upper edge and presenting an inclined free face;
   b) providing passages that place each of said beds in communication with an elevated space containing said granular material and capable through action of gravity of supplying said material to said bed on demand;
   c) providing neighboring transverse nonporous plates above and below each said porous plate;
   d) forwardly flowing said dusty gas from a dusty gas-distribution compartment nearby said lower edges and into each said bed across its free face, said free face cooperating with its neighboring superjacent nonporous plate to direct the flow of said dusty gas from said dusty-gas-distribution compartment and into said free face, said dust thereby being filtered from said gas and accumulating upon said free face to form a filter cake, cleaned gas leaving said bed across said inclined porous plate, said porous plate cooperating with its subjacent neighboring nonporous plate to direct said cleaned gas to flow toward a cleaned-gas-collection compartment; and
   e) thereafter creating en masse displacement of said granular material in each said bed respecting said bed's supporting porous plate face through action of a sharp upward motion of each said plate, said displacement causing a moiety of said granular material along with said filter cake to spill from said face, and thereby creating demand for supply of said granular material via said passages.

10. A gas filter comprising:
   an upwardly extending assembly of filter trays, each tray having an inclined porous supporting plate having lower and upper edges;
   a dusty-gas-distribution compartment nearby said lower edge of each said plate;
   a cleaned-gas-collection compartment;
   an inlet for admitting dusty gas into said dusty-gas-distribution compartment;
   an outlet for removing cleaned gas from said cleaned-gas-collection compartment;
   closure means preventing dusty gas from flowing from said dusty-gas-distribution compartment into said clean-gas-collection compartment save by way of said inclined porous supporting plates;
   gravity feed passages for supplying a loose granular material to beds supported by said porous plates, said passages being disposed in a way such as to prevent a flow of gas through granular material contained therein;
   means for creating en masse displacement of said granular material in each said bed respecting said bed's supporting plate, thereby causing a moiety of said granular material to fall away from the free face of each said bed, the loss of granular material from said bed being made good by flow of said material from said gravity feed passages.

11. The gas filter of claim 10 in which said means for creating said en masse displacement comprises means for producing a reverse transient surge flow of gas, passing from said cleaned-gas-collection compartment into said dusty-gas-distribution compartment.

12. The gas filter of claim 10 in which said means for creating said en masse displacement comprises means for causing said porous plates to move sharply upward.

13. The gas filter of claim 10 in which said gravity feed passages include a number of substantially vertical pipes of circular cross-section, each pipe comprising an assembly of pipe elements, each element including a short end segment having a diameter such that each said pipe element in said assembly fits snugly into its superjacent and subjacent pipe-element neighbors.

14. The gas filter of claim 13 in which each said pipe element carries one porous supporting plate.

* * * * *